United States Patent [19]

Borgersen

[11] 4,191,063
[45] Mar. 4, 1980

[54] SERVO DEVICE, ESPECIALLY FOR REVERSIBLE GEARS IN MOTORBOATS

[75] Inventor: Kjell-Idar Borgersen, Hjalteby, Sweden

[73] Assignee: AB Volvo Penta, Gothenburg, Sweden

[21] Appl. No.: 839,829

[22] Filed: Oct. 6, 1977

[30] Foreign Application Priority Data

Oct. 7, 1976 [SE] Sweden ................................ 7611140

[51] Int. Cl.$^2$ ............................................. F16H 35/00
[52] U.S. Cl. .................................... 74/388 R; 74/404; 74/417
[58] Field of Search ...................... 74/404, 417, 388 R

[56] References Cited

U.S. PATENT DOCUMENTS

| 3,766,794 | 10/1973 | Wilcox | 74/404 X |
| 4,016,825 | 4/1977 | Pichl | 74/404 X |

Primary Examiner—Ronald C. Capossela

Attorney, Agent, or Firm—Baldwin & Yeager

[57] ABSTRACT

A servo device is disclosed intended for amplifying the force in a mechanical control apparatus, movable in two opposite directions when said apparatus is displaced in either direction, comprising two gears rotatably disposed in a housing and coaxial with a rotatable shaft. The gears are driven in counter-rotation by a conical pinion or by two counter-rotating cylindrical pinions in driving relation to a rotatable servo motor. A nut is screwably arranged on screw splines on the shaft between the gears. When screwed along said splines, the nut comes into frictional contact via annular friction surfaces with corresponding annular surfaces on the gears. The nut, the splines and one of the gears make a releasable driving connection with each other. Radially directed arms are attached to the shaft and the nut with control cable attachment means for transmitting the input operating force to one arm while an additional force is contributed from either gear via the shaft and splines to the other arm.

11 Claims, 2 Drawing Figures

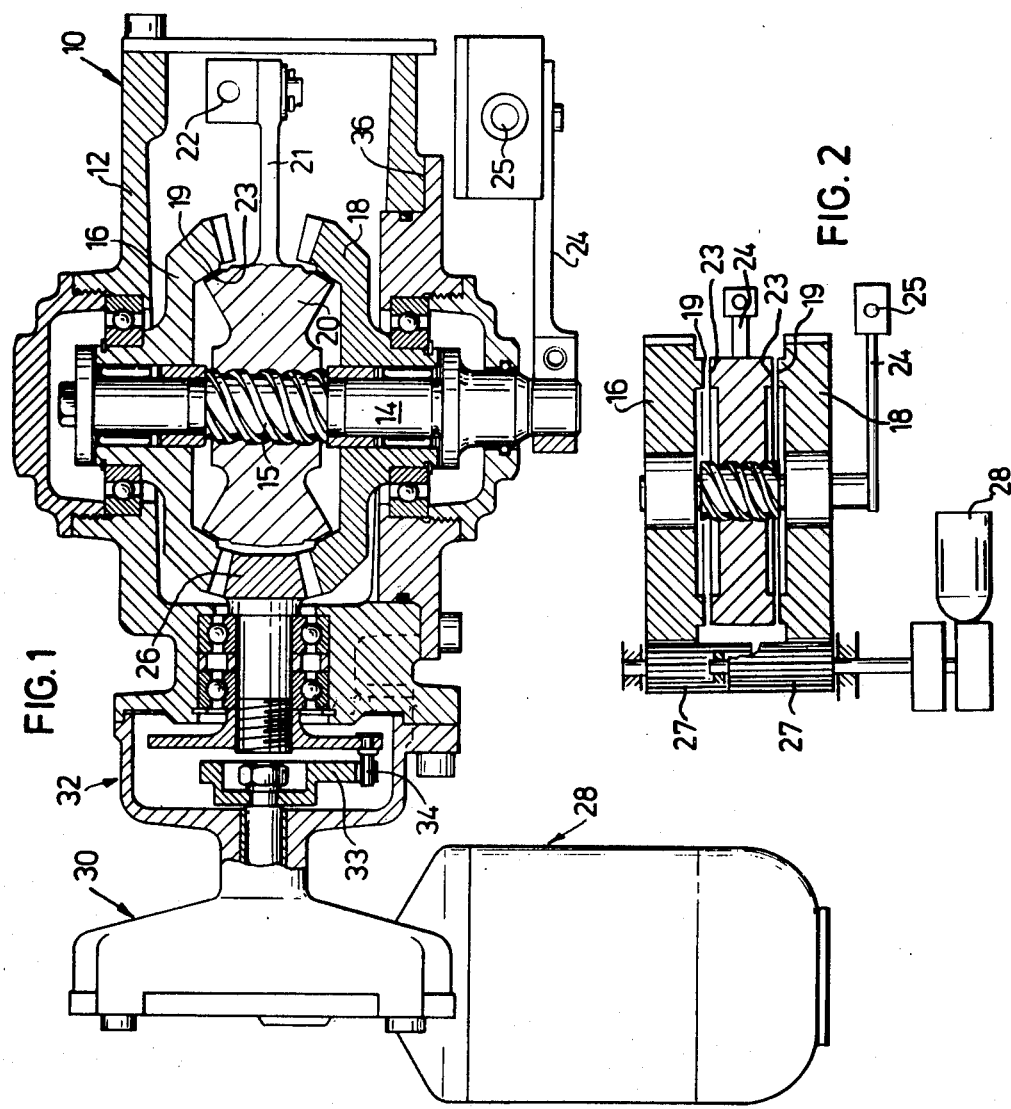

SERVO DEVICE, ESPECIALLY FOR REVERSIBLE GEARS IN MOTORBOATS

The present invention relates to a servo device, which is primarily intended to facilitate for example shifting gears in a motor when using a long control cable for pushing and pulling. The device can also have other applications however.

The problem which the invention intends to solve involved shifting a boat motor from an operator's seat situated at some distance from the motor. At short distances and with reasonably direct paths of transmission, the shifting movement and the shifting force can without difficulty be transmitted directly from a shift lever near the driver's seat by means of a flexible cable which is enclosed in a flexible sleeve and which can transmit pushing as well as pulling movements, to a gear selector on the gear box of the motor. However, the friction between the cable and the sleeve is considerable. Even at a few meters distance and with merely a few bends in the cable, necessary for practical reasons, there remains only a small portion, e.g. ¼, of the operating force at the end of the cable for shifting. This means that manual shifting is made more difficult and that rapid shifting in a critical situation cannot be done. Similar problems occur of course in cable control of other mechanical devices, to which the invention can be applied.

The problem can of course be avoided by using another transmission means than the cable in question, for example an electromechanical or hydraulic device. However, cable operation at reasonable distances of transmission has so many practical advantages, especially in a motor boat, that a suitable solution is the installation of a shifting servo at or in the vicinity of the gear box. This servo amplifies the operating force of an input control movement in a given direction in the same direction and transmits the force and movement to an output cable, which executes the operation.

Many types of servo devices similar tasks are known. However, the known servo devices for the purpose in question are in one way or another less suitable due to technical imperfections or complexity and high manufacturing costs.

The present invention solves the above-mentioned problem. The purpose of the invention is to achieve a servo device which is especially suitable as an amplifier of operating force and movement in a control cable of Bowden type, especially for use in shifting boat motors, and which, if there is a failure of the power source of the servo device, can mechanically transmit the manually applied operating impulse in the cable; and which is also simple, compact, and can be manufactured at reasonable cost.

The invention is of the type disclosed in the preamble to the main claim and which has the special features as disclosed in the characterizing clause of the main claim.

The invention is described in the following with a suitable embodiment as an example, with reference to the accompanying drawing, in which FIG. 1 shows a longitudinal section of a shifting servo according to the invention, and FIG. 2 shows schematically a variation of the device in FIG. 1.

Similar devices, although intended for transmission and reversing of motor drive power, are known by, for example, Swedish Pat. Nos. 190 266 and 194 544.

In FIG. 1 the servo device in its entirety is labelled 10. The servo 10 comprises a servo housing 12, which serves as a frame for components and a fastening means for the servo 10 to a boat hull or a motor unit.

A shaft 14 is rotatably journalled through the housing 12. The shaft has, along a portion between the journals, screw splines 15, and at one end has a lever 24 joined to the shaft, at the outer end of which lever there is an attachment means 25 for an output control cable.

A servo nut 20 can be screwed, that is can be turned and axially displaced in accordance with the threading, on the spline portion 15 of the shaft 14. An essentially radially directed lever 21 extends from said servo nut, at the outer end of said lever 21 there being an attachment means 22 for an input control cable.

On the faces of two gears 16,18 facing the nut 20 disposed between the gears, there are annular friction surfaces 19, which are parallel with corresponding annular surfaces 23 on the two sides of the nut. The annular surfaces 19,23 can in principle have any sectional profile, provided that they are parallel in every radial section, but suitably they are either slightly conical or planar. When the nut 20 is displaced axially, one of its frictional surfaces 23 will finally come in contact with friction surface 19 on one of the gears 16 or 18.

For the intended manner of operation of the device, it is important that gears 16,18 be axially fixed in the housing 12 with a small gap between the annular surfaces 19 and the corresponding surfaces 23 of the nut. Theoretically, the gap or play between the respective annular surfaces could be zero, i.e. so small that moving the lever 21 from the neutral position immediately creates contact and frictional engagement between one annular surface 23 of the nut 20 and the corresponding annular surface 19 on either gear 16 or 18. For practical reasons a larger play than zero is necessary, for example 1-2% of the radius of the annular surfaces. In order that there will be contact and frictional engagement between the annular surfaces 19,23 after a minimal displacement of the input lever from a position where there is no contact between the annular surfaces 19,23, the distance between the annular friction surfaces 19 of the gears 16,18 should be able to be finely adjusted by means of a trimming means 36. This can suitably be a shim 36 disposed between the material of the housing 10 and the thrust bearing of one of the gears, so that displacing the shim in either direction increases or reduces the spacing between the gears 16,18. The trimming means can also be a nut threaded in the housing 10, which presses the thrust bearing of one of the gears against a compliant gasket so that the distance between the gears 16,18 is changed.

Furthermore care must be taken in selecting the pitch of the screw splines 15, so that it, in view of the friction between the interacting parts,—the spline portion 15, the nut 20 and the annular surfaces 19 and 23—does not cause friction locking between the spline portion 15 and the nut 20 after the nut 20 by tightening has been pressed against one of the gears 16,18. When using usual contruction materials and surface finishes, a pitch of about 30° appears suitable.

Although the device as now described does not amplify an input operating force, it can in any case transmit such force and movement, which is necessary if there is a friction failure in an external drive source. This is done in the following manner. Turning the lever 21 in the direction into the plane of the figure—if the shaft 14 is held at the prevailing rotational angle by, for example, an inhibiting force at the cable attaching means 25, causes the nut 21 to be screwed upwards on splines 15 until contact is made between annular surface 23 and the annular surface 19 of the gear 16. Continued turning of the lever 21 produces an engagement between the splines of the nut and the shaft, thus turning the shaft 14, lever 24 and cable attachment means 25 in the same direction as the lever 21. Turning the lever 21 in the opposite direction produces in the same manner a transmission of this movement to lever 24. The output torque is of course, due to bearing friction, somewhat less than the input torque.

In order that the device will also amplify the input operating force in transmission, an external power source must apply a torque and a rotation to the gears 16,18 in the same direction as mentioned above, i.e. that the portion of the gear 16 closest to the lever 21 rotates into the plane of the figure, and the gear 18 in the opposite direction. It is also desirable that the gears 16,18 rotate at the r.p.m. which produces the most suitable output movement in the cable attachment means 25 of the lever 24 without maximizing the output speed and that the applied torque has a suitable magnitude.

In the embodiment shown the two gears 16,18 are two identical conical toothed gears, which are driven in a known manner in opposite rotational directions by means of a corresponding conical pinion 26 of smaller diameter and with fewer teeth than the gears 16,18, for gearing down the input r.p.m. to the pinion. The conical angle in the pinion can be varied within such limits that the pinion 26 can be cylindrical and the two crown wheels planar.

In a variation of the embodiment according to FIG. 2, the gears 16,18 can have external cylindrical teeth and the pinion 26 is replaced by two cylindrical pinions 27, 27' parallel to the shaft 14, one of which engages gear 16 and the second pinion, which in turn engages gear 18 to impart synchronic counter-rotational movement to the gears 16,18.

The driving force to the servo device according to the invention, as shown in FIG. 1, comes from an electric motor 28, which drives the pinion 26 via a worm gear 30 and a free-wheel 32.

The electric motor 28 is usually switched off and idle. By means of a microswitch (not shown) at the shift lever in the driver's seat, the electric motor 28 is switched on as soon as the shift lever has been moved from one of its fixed gear positions and is switched off again when the shift lever again assumes a fixed shift position.

The worm gear 30 sharply reduces the r.p.m. of the electric motor, for example by a ratio of 90:1, which in combination with the down gearing between the pinion 26 and the crown wheels 16,18 gives the latter a frequency of approximately ⅓ Hz or 18-20 r.p.m., which corresponds approximately to a rapid manual displacement of the cable attachment means 22,25 for shifting.

The free-wheel 32 has the task of transmitting the torque from the worm gear 30 in one direction of rotation to the pinion 26, but to allow at the same time the pinion 26 to rotate freely in the same direction at a higher r.p.m. than the output shaft of the worm gear 30. This situation can occur when there is a failure of the electric motor 28 or if the input lever 21 is moved by hand by means of the shift lever faster in either direction than the corresponding rotation of either crown wheel 16,18.

The free-wheel 32 can be any type of free-wheel which provides a positive drive connection in one direction of rotation and none or insignificant drive connection in the other direction. A simple, inexpensive and suitable type of free-wheel for the invention is that shown in the drawing, in which an excentrically disposed leaf spring is externally supported and reinforced along part of its length by a supporting arm 33 while the outer end of the leaf spring can abut a pin 34 parallel to and rigidly joined to the shaft leading to the pinion 26. The stiffness of the leaf spring is selected so that the desired driving connection is produced by the torque from the worm gear 30 and that the pin 34 pushes back the leaf spring for free rotation if the r.p.m. of the pinion 26 should, due to greater input force in the lever 21, exceed that of the worm gear 30 and consequently that of the leaf spring.

Only one pin 34 is necessary for functioning, but several such pins distributed with even angular spacing, can reduce conceivable play in the transmission.

The servo device according to the invention thus described solves the problems posed and fulfills the purposes of the invention by serving under normal operating conditions as an amplifier of force in the control movement in either direction in a control cable manually remotely displaced, and in a failure of the power source of the servo device, transmits, with minimal power loss in the device, the input operating movement to the corresponding output operating movement.

What I claim is:

1. Servo device for amplifying the force in a mechanical control apparatus, movable in two opposite directions, when said apparatus is displaced in either direction, comprising two gears rotatably disposed in a housing, and coaxial with a rotatable shaft, means comprising a servo motor and a driving connection therefrom to said gears for driving said gears in counterrotation, and a nut screwably arranged on screw splines on the shaft between the gears, said nut when screwed along said splines coming into frictional contact via annular friction surfaces with corresponding annular surfaces on the gears, said nut, said splines and one of the gears making a releaseable driving connection with one another, characterized in that radially directed arms are attached to the shaft and to the nut, with control cable attachment means for transmitting the input operating force to one arm, while an additional force is contributed from a respective one of said gears via the shaft and splines to the other arm.

2. Servo device according to claim 1, characterized in that said driving connection includes a free-wheel which allows transmission of torque to said gears only in the driving direction of the motor.

3. Servo device according to claim 2, characterized in that the driving connection between the drive motor and the free-wheel includes a reduction gear.

4. Servo device according to claim 2, characterized in that the motor is switched on for driving by means of a switch which closes the circuit only when a control member in mechanical connection with one of the cable attachment means is displaced from a fixed control position.

5. Servo device according to claim 2, characterized in that said gears are cylindrical toothed gears and that said driving connection comprises two counter-rotating cylindrical pinions respectively in mesh therewith.

6. Servo device according to claim 1, characterized in that the motor (28) is switched on for driving by means of a switch which closes the circuit only when a control member in mechanical connection with one of the cable attachment means (22,25) is displaced from a fixed control position.

7. Servo device according to claim 1, characterized in that it comprises a trimming means, in the housing, for fine adjustment of the distance between the gears, so that each gear frictionally engages the nut at an angular displacement in a respective direction of at most ±5° from a center position at which there is no frictional engagement between the nut and either of the gears.

8. Servo device according to claim 6, characterized in that said gears are conical toothed gears and that said driving connection comprises a conical pinion in mesh therewith.

9. Servo device according to claim 1, characterized in that said gears are conical toothed gears and that said driving connection comprises a conical pinion in mesh therewith.

10. Servo device according to claim 1, characterized in that said gears are cylindrical toothed gears and that said driving connection comprises two counter-rotating cylindrical pinions respectively in mesh therewith.

11. In a servo system for amplifying the force in one direction in a mechanical control apparatus, movable in two opposite directions, when said apparatus is displaced in a predetermined one of said directions, having a gear rotatably disposed in a housing, a rotatable shaft having screw splines, said gear being coaxial and rotatable with said shaft, servo motor means for driving said gear, a nut screwably arranged on said screw splines on said shaft adjacent said gear, said nut when screwed along said splines toward said gear coming into frictional contact via annular friction surfaces with cooperative annular surfaces on said gear, said nut and said splines and said gear constituting a releasable driving connection with one another, the improvement comprising a pair of radially directed arms being respectively attached to said shaft and to said nut, control attachment means coupled to said arms for transmitting the input operating force to one said arm, while an additional force is contributed from said gear via said shaft and splines to the other said arm.

* * * * *